Dec. 28, 1954  G. E. GROSCHEN  2,697,859
FUMIGATING APPARATUS
Filed March 27, 1950  3 Sheets-Sheet 1

INVENTOR.
George E. Groschen
BY
ATTORNEY.

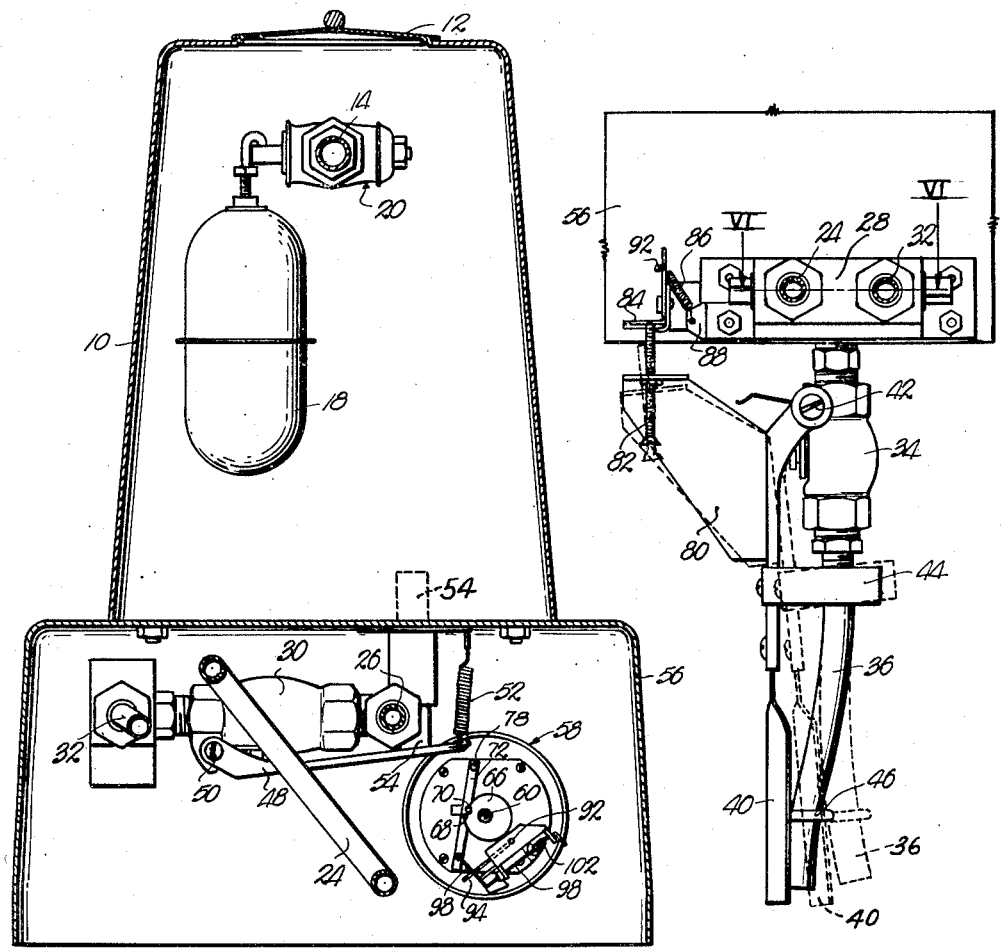

United States Patent Office 2,697,859
Patented Dec. 28, 1954

2,697,859

FUMIGATING APPARATUS

George E. Groschen, Kansas City, Mo., assignor to Cook Chemical Company, Kansas City, Mo., a corporation of Missouri Application March 27, 1950, Serial No. 152,241

8 Claims. (Cl. 21—109)

This invention relates to the field of treating and tempering materials as the same continuously flow in a steady stream, the primary object being to provide apparatus for applying a fluid to the material automatically and in predetermined quantities throughout the time the material is in motion.

It is the most important object of the present invention to provide apparatus for treating grain and like materials and relates particularly to a fumigating device adapted to be placed in operation by the flow of grain itself and to continue applying a fumigant to the grain at a steady rate until the flow of grain ceases.

Another important object of the present invention is to provide fumigating apparatus having as a part thereof means that is placed in operation by the flow of grain to direct a steady stream of fumigant to the grain and having additionally an auxiliary supply of the fumigant that is dumped upon the grain or caused to flow thereto near the end of the operations whereby to "seal in" the bin of grain at the top thereof with a relatively heavy coating or impregnation of the fumigating substances.

Another important object of the present invention is to provide fumigating apparatus having a container provided with a valved outlet line, the valve being actuated by a paddle attached thereto by the grain impinging on the paddle as it flows from one bin to another.

A further object of the present invention is to provide a grain fumigator having a container for the fumigant to be applied to the flowing grain that is provided with a pair of outlet lines, each having a valve therein, one of the valves being controlled by the flow of grain and the other valve being actuated through the medium of a timing mechanism for dumping an additional quantity of the fumigant upon the grain after the apparatus has been in use for a predetermined period of time.

Other objects of the present invention include the way in which a predetermined amount of fumigant is maintained in its container until the dumping operation takes place; the way in which the timing mechanism is adapted for setting in accordance with the amount of grain to be treated; the manner of interconnecting the paddle operated valve with the timing mechanism to render the latter inoperable before the flow of grain commences; and the way in which the main supply line and the auxiliary supply line for the fumigant are coupled together for control by a single paddle operated valve.

In the drawing:

Fig. 3 is a vertical, cross-sectional view on a reduced scale taken on line III—III of Fig. 2 through the said housing and the fumigant tank removed from said hopper, and looking in the direction of the arrows.

Fig. 4 is a fragmentary, vertical, cross-sectional view taken on line IV—IV of Fig. 2 looking in the direction of the arrows.

Fig. 5 is an enlarged, fragmentary, detailed perspective view looking into said housing through the open bottom thereof and at an angle, showing the timing mechanism and a portion of the spring-loaded valve control plate shown in Figs. 2 and 3.

Figure 6:
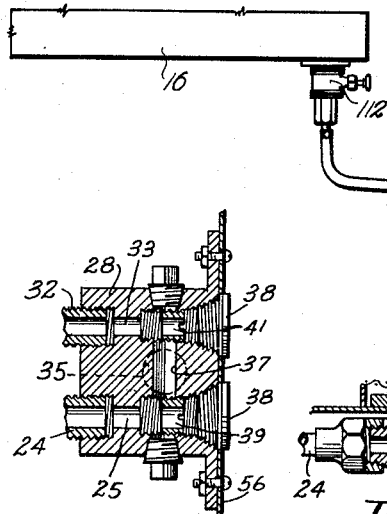
Fig. 6 is a fragmentary, cross-sectional view taken on line VI—VI of Fig. 4.

Those experienced in the field of fumigating grains against weevil and other insects are well aware of the fact that the fumigant must be evenly dispersed throughout the bin of grain particularly in the case of large bins in order to effectively kill the bugs and to maintain the infestation at a minimum. While the fumigants most commonly used for this purpose are capable of creating a gas that moves within the pile of grain and permeates a substantial portion thereof, such movement of the vapors is limited and unless the fumigant is applied to the grain evenly and constantly as the bin is being filled, an effective fumigation cannot be accomplished. Obviously, many attempts have been made to apply the liquid fumigant continuously as the bin is being filled but such attempts have for the most part, been under manual control and therefore, subject to human errors. Consequently, even if a small portion of the pile of grain is left untreated, the insects will soon multiply and the entire bin become infestated.

As will hereinafter appear, the apparatus forming the subject matter of this invention is capable, when placed in use, of feeding a predetermined amount of the fumigant to the grain as the same flows into the bin at a constant rate and throughout the entire bin filling operation.

Furthermore, the apparatus is capable of automatically dumping an added supply of the fumigant upon the pile of grain adjacent the top thereof to effectively seal the same and assure that complete fumigation has been perfected. Such apparatus is clearly illustrated in the drawings and includes a hollow tank 10 provided with an access opening at the top thereof that is covered by a lid 12.

Liquid fumigant to be used in treating small grains and other material is directed to the tank 10 by means of a conduit 14 that joins with a relatively large supply tank 16. As the liquid fumigant gravitates to the tank 10 and collects therewithin, a float 18 (Fig. 3) is caused to rise and to close a valve 20 within the tank 10 and interposed in conduit 14. Accordingly, as the fumigant within tank 10 is drained therefrom as hereinafter set forth, the float 18 and valve 20 will maintain a predetermined level of fluid in tank 10.

Figure 7:
Fig. 7 is a fragmentary, cross-sectional view taken on line VII—VII of Fig. 2.

An outlet T 22 (Figs. 2 and 7) communicates with the tank 10 in the bottom thereof and registers with a pair of outlet pipes 24 and 26. Pipe 24 is connected with a bore 25 in a hollow head 28 while pipe 26 is connected with a valve 30 (Figs. 2 and 3) that in turn registers with a pipe 32 having connection with a bore 33 (Fig. 6) in head 28 as shown also in Fig. 4. A valve 34 below head 28 is in communication with a port 35 in head 28 and with a flexible tube 36 depending from valve 34.

The passage of liquid from pipes 24 and 32 is governed by restricting bores 25 and 33 within head 28, through valving means in head 28 in the nature of inserts 39 and 41 for bores 25 and 33 respectively, and rendered accessible upon removal of plugs 38. Inserts 39 and 41 partially close a horizontal passage 37 in head 28 that interconnects bores 25 and 33 and communicates with vertical port 35.

Normally closed valve 34 is actuated through the medium of a paddle 40 that is pivotally secured to the housing for valve 34 as at 42 and depends therefrom along tube 36. Paddle 40 and tube 36 are joined through the medium of suitable brackets 44 and 46.

Normally open valve 30 is controlled through the medium of a plate 48 that is swingably secured thereto as at 50 and yieldably held upwardly, holding valve 30 open by means of a spring 52. Plate 48 is manually actuated and moved downwardly against the action of spring 52 to a position closing valve 30 by means of a vertical plunger 54 reciprocably mounted in an open bottom case 56 below tank 10 and serving as a housing for a substantial amount of the mechanism just above set forth.

A timing mechanism broadly designated by the numeral 58 is mounted within case 56 and upon one wall thereof. Timing mechanism 58 is for the most part, of conventional character and includes a horizontal, rotatable shaft 60 (Figs. 2 and 3) that extends through case 56 and has a manually operable indicating pointer 62 secured thereto exteriorly of case 56. Timing mechanism 58 includes additionally a train of gears 64 that are rotated by a driving spring not shown, to in turn impart rotation to shaft 60 and pointer 62. The spring is wound or energized by rotation of pointer 62 in one direction and when gears 64 are released, such spring causes rotation of the latter and of the shaft 60 as well as the pointer 62 in the opposite direction.

Shaft 60 has a cam 66 on the innermost end thereof that is provided with a notch 68 normally receiving a pin 70 as indicated in Fig. 3 of the drawings. Pin 70 projects laterally from a link 72 that is mounted for swinging movement on an axis 74 parallel with shaft 60. Link 72 is held at one end of its path of travel with the pin 70 biased against the periphery of cam 66 by a spring (see Fig. 8) connected to a lateral extension on link 72. Pin 70 is normally disposed within the notch 68 as illustrated in Fig. 3 and rotation of cam 66 in one direction will force pin 70 out of notch 68. Obviously, the further pointer 62 is rotated in said one direction, the longer timing mechanism 58 will operate before cam 66 moves to a position disposing notch 68 for receiving pin 70.

Figure 8:
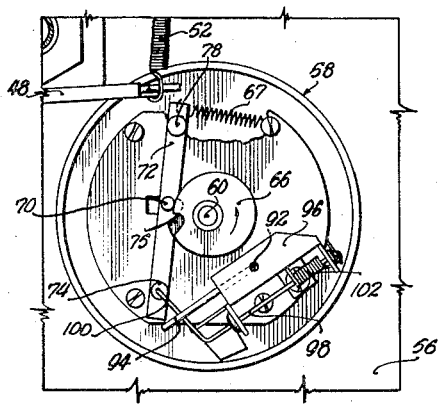
Fig. 8 is an enlarged elevational view of the timing mechanism shown in Figs. 3 and 5, parts being broken away to reveal details of construction.
Figure 9:
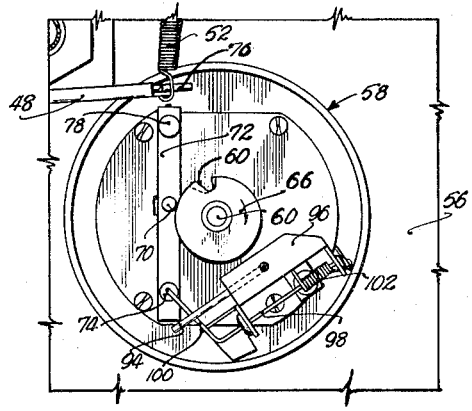
Fig. 9 is a view similar to Fig. 8 but showing parts of the timing mechanism in a different position.

Means may be provided for preventing entrance of pin 70 into notch 68 when pointer 62 is manually rotated a full 360 degrees in the direction of the arrow in Fig. 8. Such means includes a plate 75 on shaft 60, loosely mounted for but 2 or 3 degree rotation relative to shaft 60. When the shaft 60 is rotated to set the timer 58 in the direction of the arrow in Fig. 8, plate 75 will lag behind, thereby presenting a bridge across notch 68 for the pin 70. When the timer operates to rotate cam 66 in the opposite direction, as shown by the arrow in Fig. 9, plate will clear notch 68 for the reception of pin 78 when the notch 68 aligns with pin 78.

The plate 48 is provided with an elongated rod 76 shown best in Fig. 5, that projects outwardly beyond that end thereof adjacent spring 52 and opposite to pivot point 50 adapted to lock with a laterally extending pin 78 adjacent the free end of link 72. Thus, as plunger 54 is depressed downwardly to swing plate 48 downwardly on pivot 50 against the action of spring 52 away from the position shown in Fig. 3, and pointer 62 thereupon rotated in one direction to turn cam 66 anti-clockwise, viewing Fig. 3, link 72 will be swung by cam 66 to a position disposing pin 78 above rod 76 as shown in Fig. 5, and thereby hold plate 48 against return movement toward the normal position illustrated in Fig. 3 under the influence of spring 52. As cam 66 returns to the normal position for receiving pin 70 as above set forth, pin 78 will move off of rod 76 and release plate 48.

Paddle 40 is provided with a laterally extending bracket 80 that has an adjustable screw 82 thereon. Screw 82 moves toward and from a position bearing against a swingably mounted lever 84 that is held biased downwardly toward the upper end of screw 82 by a spring 86 having connection with an arm 88 on case 56. At this point it is notable also that paddle 40 is held biased toward a position closing valve 34 by a spring 90 coiled on pivot pin 42.

Figure 10:
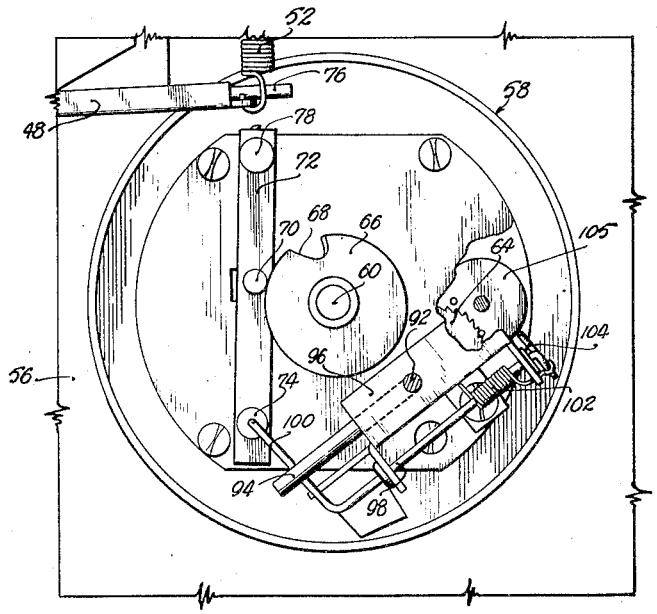
Fig. 10 is an elevational view, still further enlarged showing the timing mechanism, parts being broken away for clearness.

One end of an elongated, non-rotatable, longitudinally reciprocable rod 92 is secured directly to the lever 84 and extends along case 56 toward the timing mechanism 58. The opposite end of rod 92 has a lateral projection 94 and rod 92 is slidably mounted in a bracket 96 secured to timing mechanism 58. Bracket 96 also rotatably carries a shaft 98 that has an offset end 100 within the path of travel of projection 94 of rod 92. End 100 of shaft 98 is held biased against projection 94 by a spring 102 coiled on shaft 98. Spring 102 also holds a lock 104, forming a part of shaft 98 at that end thereof opposite to portion 100, in frictional engagement with the periphery of an escapement disc 105 (see Fig. 10) that is oscillated by gears 64. Spring 86 yieldably holds projection 94 biased toward mechanism 58 against end 100.

Accordingly, after indicator 62 has been rotated to set the timing mechanism 58, the latter will not operate until such time as lock 104 is released by grain moving against paddle 40 and swinging the same to the dotted line position shown in Fig. 4. Such movement of paddle 40 moves pin 82 away from lever 84, which in turn shifts rod 92 on its longitudinal axis within bracket 96. Projection 94 then moves the portion 100 and causes rotation of shaft 98 against the action of spring 102 to retract lock 104 with respect to disc 105, thereby releasing or unlocking the train of gears 64.

Figure 1:
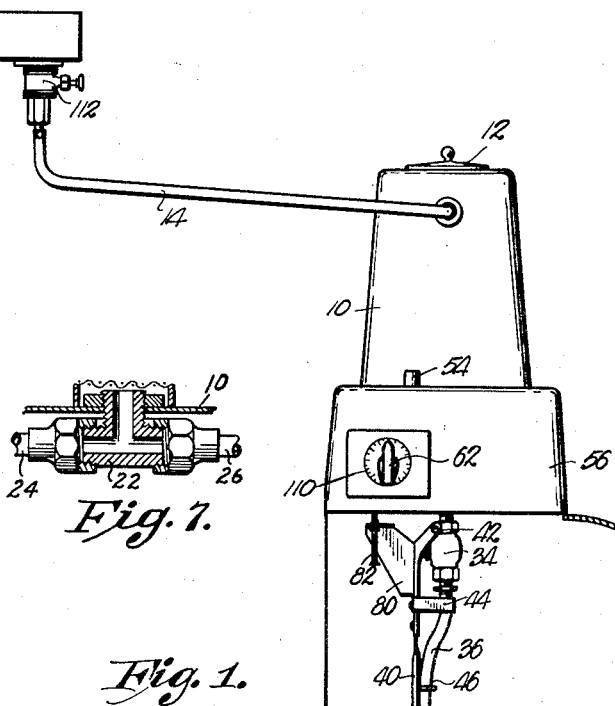
Figure 1 is an end elevational view of fumigating apparatus made in accordance with the present invention and showing the same in operative use.

As above indicated, the apparatus hereof is designed for automatic operation by the flow of grain itself. In Fig. 1, there is shown one way of placing the apparatus in use and including a conveyor belt 106 that is adapted to move grain from a bin or other point of delivery not shown, into a hopper 108 that may lead to another bin or place of storage for the moved grain. The apparatus may also be installed on spouts where belt conveyors are not available.

It is quite common that the elevator operator knows the amount of grain in a given bin that is to be transferred and also has knowledge of the time that will be consumed through use of conveyor 106 for transferring the grain through hopper 108 to another bin. With this knowledge, plunger 54 is first depressed and the indicator 62 is rotated to a desired position depending of course, upon the amount of grain to be fumigated. Indicator 62 is rotated clockwise, viewing Fig. 1, a sufficient distance to cause operation of the timing mechanism 58 until all but approximately 1,000 bushels of the grain have been conveyed into hopper 108. With a conveyor 106 capable of handling a predetermined number of bushels of grain for a given period of time, a dial 110 may be calibrated in capacity per 1,000 bushels or less. Similarly, the inserts 39 and 41 within head 28 enclosed by plugs 38, may each be calibrated in gallons per 1,000 bushels more or less.

With the apparatus thus set for operation, valve 30 is held closed by virtue of rod 76 on plate 48 underlying pin 78 on link 72. Link 72 and its pin 78 act therefore, as trigger means to hold the rod 76 until tripped by spring 67 pulling link 72 to move pin 70 into notch 68, whereupon spring 52 moves rod 76 to the position shown in Figs. 8–10. A suitable valve 112 on tank 16 is opened to fill the tank 10 until such time as float 18 rises to close valve 20. Grain upon the uppermost surface of conveyor 106 will then move against paddle 40 moving the same to the dotted line position shown in Fig. 4 and causing opening of valve 34. As long as grain continues to flow into hopper 108, valve 34 will remain in the open position.

Figure 2:
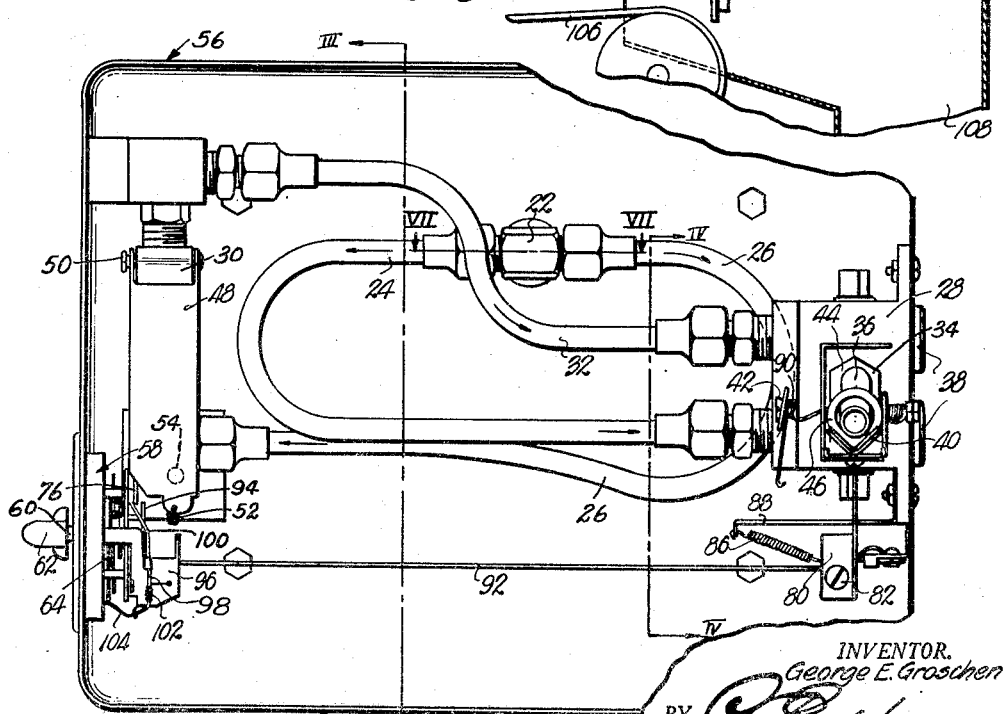
Fig. 2 is an enlarged bottom plan view looking into the open bottom housing when removed from the grain-receiving hopper.

As soon as paddle 40 is thus moved, screw 82 will move away from lever 84 and spring 86 will shift rod 92 to the left viewing Fig. 2 to release lock 104. Fumigant will flow from tank 10 through T 22, pipe 24, bore 25, passage 37, port 35, valve 34 and thence through tube 36 upon the grain passing into hopper 108. During such operation, float 18 will maintain a predetermined level of fumigant within tank 10 and timing mechanism 58 will operate to return cam 66 toward the normal position shown in Fig. 3. And, by virtue of valve 30 remaining closed, the fumigant cannot flow from T 22 through pipes 26 and 32.

As above set forth, after timing mechanism 58 completes its operation, plate 48 will be released to open valve 30 and at this time approximately 1,000 bushels of grain will remain to be transferred by conveyor 106 into hopper 108. As soon as valve 30 opens, an increased flow of fumigant from tank 10 will pass from T 22, through pipe 26, valve 30, pipe 32, bore 33, passage 37, port 35, valve 34 and tube 36. By the time the last 1,000 bushels of grain have been conveyed into hopper 108, the level of liquid in the tank 10 will have lowered to a point near the bottom of tank 10 even though float 18 has moved to the posititon shown in Fig. 3 for opening valve 20, and even though fumigant is flowing from tank 16 to tank 10 at the full capacity of conduit 14. As soon as the flow of grain ceases, paddle 40 will return to the position shown by full lines in Fig. 4, closing valve 34 and permitting lock 104 to again mesh with one of the gears 64. The flow of fumigant from tube 36 is thus stopped irrespective of the fact that valve 30 remains open. Valve 112 is thereupon closed if desired or tank 10 is permitted to refill until such time as float 18 closes valve 20.

When valve 34 opens, fumigant flows from line 24 to the grain and gears 64 are unlocked to start the timing mechanism 58. When cam 66 rotates to receive pin 70, pin 78 releases plate 48 to open valve 30. Fumigant then flows not only in line 24 to the grain but in line 26 through valve 30 and line 32 to the grain. This dual flow continues until the grain flow ceases, whereupon valve 34 closes.

From the foregoing it is now understood that a variable amount of fumigant may be delivered to the flowing grain constantly as the same flows into hopper 108 by adjusting the inserts 39 and 41 in head 28 behind plugs 38. It is contemplated that these inserts be adjustable from zero to approximately 4 gallons per 1,000 bushels. However, it is usual that one and one-half gallons of the liquid fumigant be fed to each 1,000 bushels of the grain. Also, since conveyor systems for grain vary in capacity from 2,000 bushels per hour to as high as 30,000 bushels per hour, provision of timing mechanism 58 permits adjustment to accommodate various types of grain moving systems.

A relatively large bin therefore, may be fumigated throughout with a predetermined amount of fumigant for each 1,000 bushels as the bin is being filled and the apparatus automatically feeds an additional amount of the fumigant as the last 1,000 bushels are being conveyed.

The human element and errors that result therefrom are entirely eliminated and once the apparatus is set, its operation continues automatically and without the necessity of attention until the flow of grain ceases.

By way of further explanation of the operation of the fumigating apparatus hereof, an approach may be made from the standpoint of instructions to an operator.

First, the insert 39 within the head 28 and accessible through removal of one plug 38, should be set to permit a constant flow of fumigant from pipe 24 to tube 36 at a predetermined rate when valve 34 is open. Next, the operator should set the insert 41 in head 28 made accessible by removal of the other plug 38, to permit a constant flow of fumigant from pipe 32 to tube 36 when valves 30 and 34 are open.

Next, the operator should determine the period of time that will be consumed in transferring all but approximately 1,000 bushels of grain from one bin to another by way of belt 106 and hopper 108. Pointer 62 is then turned in one direction against the action of the spring (not shown) for operating gears 64 of timer 58 in accordance with such estimated time and as guided by the dial 110. Before actuating pointer 62 however, the operator should depress the plunger 54 so as to actuate plate 48 on its pivot 50 against the force of spring 52 to close the normally open valve 30. This places rod 76 in a position where re-closing of the valve 30 will not occur because of cam 66 on pointer 62 shifting link 72 and accordingly, the pin 78 within the path of travel of rod 76. In other words, when pointer 62 is turned from the position shown in Fig. 1, cam 66 will be rotated from the position shown in Fig. 3 to a position such as illustrated in Fig. 5 where pin 70 is without notch 68. As long as pin 70 rides on the peripheral surface of cam 66, and until it is received by notch 68, the pin 78 will be in a position for receiving rod 76 and valve 30 will be maintained closed. While the pointer 62 returns to the normal position shown in Fig. 1, valve 30 being closed will prevent flow of fumigant from the tank 10, through pipe 26, valve 30, pipe 32, head 28 and tube 36 even though valve 34 is open. With the apparatus thus set, as soon as the grain to be fumigated is transferred by belt 106 into the hopper 108, such grain will move against the paddle 40 to open valve 34. Fumigating fluid will immediately flow from tank 10, through T 22, pipe 24, head 28, and thence through open valve 34 and tube 36. Simultaneously, with such opening of valve 34 by movement of paddle 40, lock 104 will be actuated to release the timer 58 and permit rotation of gears 64 in response to the actuating spring therefor and forming a part of the timer 58. Lock 104 is released by movement of screw 82 on the bracket 80 that is in turn mounted on paddle 40. Spring 86 operates to shift rod 92 so that its projection 94 acts on end 100 of shaft 98 against the action of spring 102, thereby swinging lock 104 to the released condition.

As soon as cam 66 rotates to a position for receiving pin 70 by its notch 68, the link 72 will swing to the position shown in Fig. 3 or away from the position shown in Fig. 5, thereby releasing rod 76. Spring 52 thereupon acts on plate 48 to operate valve 30 and return the latter to its normally open condition. Valve 34 still being open, by virtue of flowing grain on belt 106, a double or added flow of fumigant is directed to the tube 36. The secondary flow is from T 22, through pipe 26, valve 30 that is now open, pipe 32, head 28, valve 34 and tube 36. Such double flow of the fumigant continues until such time as the flow of grain ceases, whereupon spring 90 operates to re-close valve 34. The last 1,000 bushels of grain will thereupon be treated with an added quantity of fumigant and if valve 112 remains open, float 18 will operate valve 20 to re-fill the tank 10 if the same has become emptied or virtually empty by the time that valve 34 re-closes.

Having thus described the invention, what is claimed as new and desired to be secured by Letters Patent is:

1. Apparatus for treating flowing material comprising a fluid container; an outlet tube disposed to direct fluid to flowing material to be treated; a first valve in said tube; valve actuating means disposed in the path of travel of said flowing material and disposed for movement thereby to a position holding the valve open; a first and a second outlet pipe, each coupled with said container; means common to the pipes and coupled with said tube for receiving fluid from said pipes; a second valve in said second outlet pipe; releasable structure for holding the second valve closed; and timing mechanism having means for releasing said structure after a fluid has been directed from the container through the first pipe, the first valve and the tube to the flowing material for a predetermined period of time, whereby an increased flow of fluid is directed to the flowing material by the second pipe.

2. Apparatus as set forth in claim 1 wherein said structure is provided with a movable member having yieldable means for holding the same biased toward one end of its path of travel and trigger means for holding the member at the opposite end of its path of travel.

3. Apparatus as set forth in claim 1 wherein said structure is provided with a movable member having yieldable means for holding the same biased toward one end of its path of travel and trigger means for holding the member at the opposite end of its path of travel; and wherein said mechanism is provided with an element rotatable to a position tripping said trigger means.

4. Apparatus for treating material as the same flows into a material receptacle and prior to entry of the material thereinto, said apparatus including a fluid container; a valved outlet line communicating with said container; movable structure within the path of travel of the material to be treated and operably connected with the valve in said line for engagement by the material and actuation by the force of movement thereof to a position holding said valve open; and a conduit coupled with said valve for receiving fluid from said line when the valve is open, said conduit being disposed to direct fluid passing therethrough to said material as the material flows.

5. Apparatus for treating flowing material comprising a fluid container; a valved outlet line disposed to direct fluid from said container to flowing material to be treated; valve actuating means disposed in the path of travel of said flowing material and adapted for movement by the flowing material to a position holding the valve in said line open; structure having flow control means for directing an auxiliary flow of fluid from said container to said line; and timing mechanism coupled with said flow control means for rendering said structure operable after fluid has been directed to the flowing material through said line for a predetermined period of time.

6. Apparatus as set forth in claim 5 wherein is provided means for maintaining a predetermined amount of fluid in said container prior to operation of said structure.

7. Apparatus as set forth in claim 5 wherein is provided means interconnecting said valve actuating means and said mechanism for rendering the latter inoperable when the valve actuating means is in a position holding the valve closed.

8. Apparatus for treating flowing material comprising a fluid container; a first outlet line coupled with said container and disposed to direct fluid from the container to flowing material to be treated; a first valve in said first line; a second outlet line coupled with said container and having means connecting the same with the first line between the container and the first valve; a second valve in said second line between the container and said means; actuating means for the first valve disposed in the path of travel of said flowing material and adapted for movement by the flowing material to a position holding said first valve open; and timing mechanism coupled with the second valve for opening the latter after fluid has been directed to the material through said first line for a predetermined period of time.

References Cited in the file of this patent

UNITED STATES PATENTS

| Number | Name | Date |
|---|---|---|
| 1,766,742 | Campbell | June 24, 1930 |
| 1,877,818 | Cook | Sept. 20, 1932 |
| 1,941,499 | Siems | Jan. 2, 1934 |
| 2,172,951 | Barclay et al. | Sept. 12, 1939 |
| 2,461,649 | Manning | Feb. 15, 1949 |
| 2,461,949 | Manning | Feb. 15, 1949 |
| 2,469,814 | Crooks | May 10, 1949 |